Figure 1:
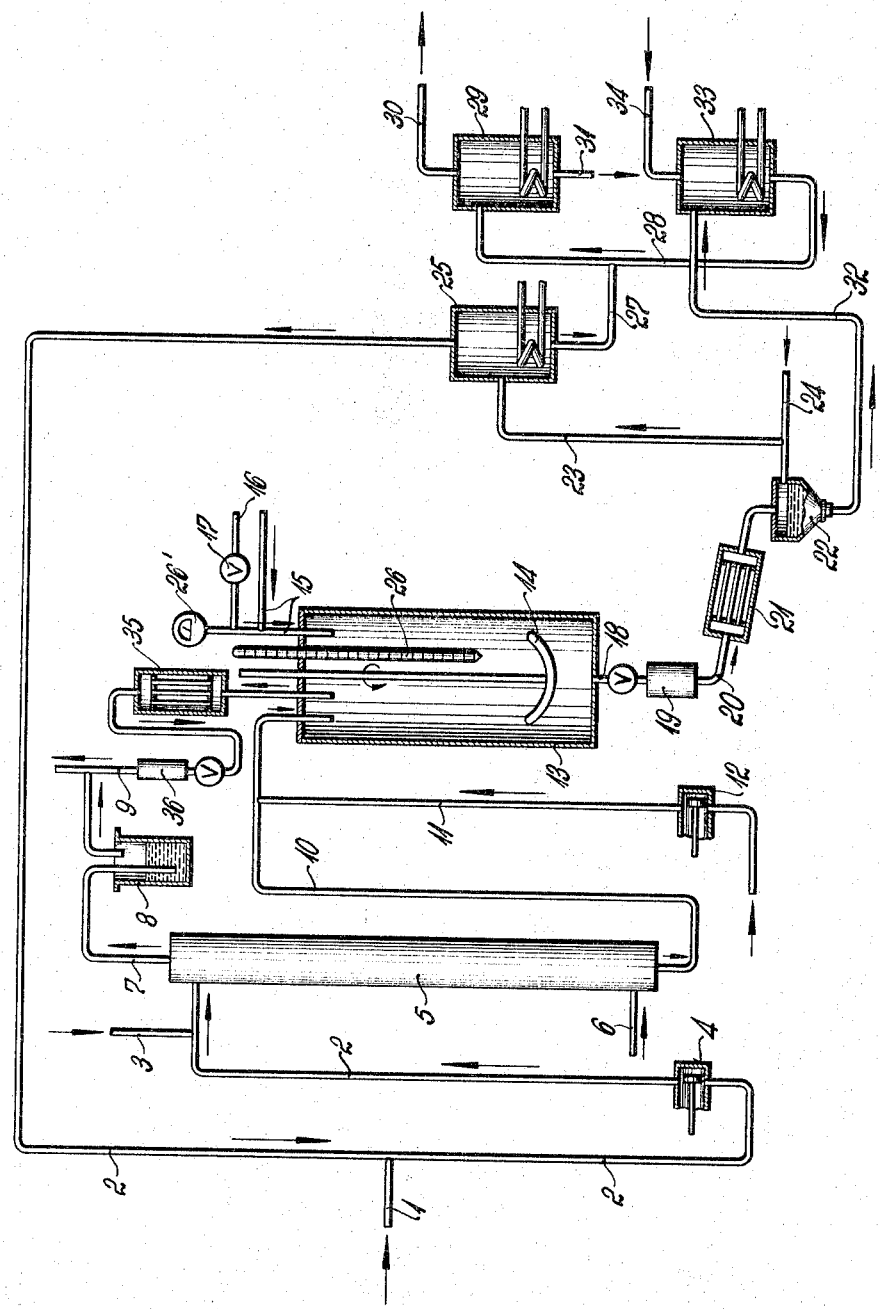

April 25, 1967 K. SENNEWALD ETAL 3,316,288
PROCESS FOR THE MANUFACTURE OF 1,2-DICYANOCYCLOBUTANE
Filed June 5, 1964 2 Sheets-Sheet 2

United States Patent Office 3,316,288
Patented Apr. 25, 1967

3,316,288
PROCESS FOR THE MANUFACTURE OF
1,2-DICYANOCYCLOBUTANE
Kurt Sennewald and Wilhelm Vogt, Knapsack, near Cologne, Heinz Erpenbach, Surth, near Cologne, and Herbert Joest, Cologne-Sulz, Germany, assignors to Knapsack-Griesheim Aktiengesellschaft, Knapsack, near Cologne, Germany, a corporation of Germany
Filed June 5, 1964, Ser. No. 373,002
Claims priority, application Germany, June 6, 1963, K 49,914
6 Claims. (Cl. 260—464)

The present invention is concerned with a process for the manufacture of 1,2-dicyanocyclobutane by catalytic dimerization of acrylonitrile at elevated temperatures and under the atmosphere of an inert gas.

British Patent No. 897,275 describes a process for dimerizing acrylonitrile resulting in the formation of 1,2-dicyanocyclobutane, wherein, for example in an inert platinum-, glass- or silver-lined vessel or in a stainless steel vessel, the acrylonitrile is heated in the presence of water at a pH-value of less than 8 at a temperature of 250–350° C. while maintaining a pressure of at least 70 atmospheres, and the resulting reaction mixture, which is allowed to cool, is then freed by distillation from unreacted feed product. The dimerization takes place exclusively in the vapor phase since the proposed temperatures and pressures are above the data critical for acrylonitrile. These are rather disadvantageous conditions because operation in the gaseous phase under pressure calls for relatively large reaction vessels which are rather expensive bearing in mind the particular nature of the material used for making the vessels.

Attempts have also been made to dimerize acrylonitrile in a stainless steel autoclave in the liquid phase in the presence of nitrogen monoxide at a temperature of 230–250° C. and at a pressure of 10 to approximately 100 atmospheres, the necessary pressure being produced by introducing an inert gas, e.g. nitrogen. After a reaction time of up to about 16 hours, about 20% of the acrylonitrile used as the feed were found to have been transformed, the yield of 1,2-dicyanocyclobutane being approximately 95%. This process, which is described in German Patent No. 1,081,008, is merely applicable to discontinuous operation for relatively short residence times of the acrylonitrile in the reaction vessel for the reason that permanent operation with recovered acrylonitrile would cause the acrylonitrile to undergo complete polymerization after as short a period of time as 24 hours, despite its being stabilized with phenothiazine in customary manner. Acrylonitrile is known to undergo polyymerization substantially more readily in the form of a liquid than in vapor form. This might have been the reason why the process described in British Patent 897,275 was carried out in the vapor phase in spite of the disadvantages mentioned above. The above disadvantageous property of liquid acrylonitrile again could not the eliminated in the processes forming the object of German Patents Nos. 1,089,754 and 1,103,330 which propose to replace the nitrogen monoxide with e.g. oxygen compounds of sulfur or carbon, in which the elements do not appear in their highest valence stage, so as to prevent polymerization. The undesired premature polymerization is decisively influenced by the proportion of acrylonitrile recovered from previous batches and used again in admixture with fresh acrylonitrile for dimerization.

The present invention now provides a process for the catalytic dimerization of acrylonitrile into 1,2-dicyanocyclobutane at elevated temperatures and under inert gas pressure, which obviates the disadvantages encountered in conventional methods and wherein the acrylonitrile is dimerized in the liquid phase in the presence of nitrogen monoxide and water as the catalyst at a pH-value of less than 7, a temperature of 180 to 260° C. and an inert gas pressure of 10 to 100 atmospheres, the dimerization being carried out within a period of time of up to 6 hours. When the reaction is complete, unreacted acrylonitrile is distilled off from the reaction mixture, and 1,2-dicyanocyclobutane retained in the residue is purified by distillation. In other words, the process of the present invention unexpectedly enables acrylonitrile to be dimerized in the liquid phase in the presence of water and nitrogen monoxide without any danger of polymerization being involved.

The process of the present invention can also be carried out in continuous manner by supplying a determined proportion of acrylonitrile within a definite period of time to the reaction vessel and by withdrawing concurrently therewith a corresponding proportion of partially dimerized reaction product, which is separated by distillation into unreacted acrylonitrile and crude 1,2-dicyanocyclobutane. In this case, the acrylonitrile is allowed to stay in the reaction vessel for a period of time of up to 6 hours, generally 1 to 4 hours, preferably 1 to 2 hours. After the addition of nitrogen monoxide and water, the acrylonitrile recovered is recycled together with fresh feed product to the reaction vessel.

The process of the present invention is carried out using as the reaction vessel a commercial steel autoclave which need not be of stainless steel. The autoclave is charged with acrylonitrile which is customarily stabilized with phenothiazine and also contains a determined proportion of dissolved nitrogen monoxide.

A proportion of 0.001 to 0.1%, preferably 0.02 to 0.03%, phenothiazine is sufficient for stabilization, especially for stabilizing the cycled acrylonitrile. The acrylonitrile contains, per kilogram, an average proportion of 100 to 2000 cc., preferably 500 to 1000 cc., dissolved nitrogen monoxide gas.

The nitrogen monoxide-containing acrylonitrile is further admixed with about 1–20% by weight, advantageously 7–15% by weight, water, calculated on the amount of acrylonitrile used as feed, and the resulting reaction mixture is heated at a temperature of preferably 230–250° C., the pressure in the reaction vessel being simultaneously increased preferably to 40–50 atmospheres by introducing an inert gas including nitrogen and hydrogen.

Due to the presence of nitrogen monoxide and water, the pH adjusts in the reaction mixture to a value of below 7. Good acrylonitrile conversion rates to the desired cyclic dimer are obtained when the pH in the reaction mixture is situated at a value of between 4 and 7, preferably 5 and 6, which obviates cyanoethylation of the water.

Such acidity of the reaction mixture can be produced when acidification of the reaction product withdrawn after completion of the reaction with an organic or inorganic acid, e. g. sulfuric acid or acetic acid or preferably phosphoric acid, precedes further treatment thereof, or when the acrylonitrile once it has been admixed with one of the aforesaid acids is first redistilled and then used for dimerization.

In order to dimerize the acrylonitrile, it is allowed to stay in the reaction vessel for a period of time of 1 to 4 hours, the reaction mixture being required to be permanently mixed, e.g. by stirring or pumping it. A time of stay of 1–2 hours may sometimes be sufficient to obtain maximum acrylonitrile conversion rates.

The inert gases include any oxygen-free gases, preferably nitrogen or hydrogen. In carrying out the present process in continuous fashion, it has proved advantageous constantly to renew the inert gas atmosphere in the reaction vessel by the continuous addition of 10–100, preferably 40–60 liters inert gas per hour.

The continuous operation of the present process will now be described by way of illustration with reference to FIGS. 1 and 2 of the accompanying drawings.

As shown in FIG. 1, acrylonitrile is supplied through line 1 to cycle line 2, stabilized therein with phenothiazine and then charged through line 3 and with the help of pump 4 to the head portion of absorption column 5. Nitrogen monoxide gas, which is substantially absorbed by the acrylonitrile flowing counter-currently thereto, is simultaneously caused to flow through line 6 into the bottom portion of absorption column 5. Minor proportions of nitrogen monoxide not absorbed leave absorption column 5 through line 7, travel through a water-charged safety vessel 8 and escape through off-gas line 9 to the outside. Nitrogen monoxide-containing acrylonitrile is removed at the bottom portion of absorption column 5, caused to absorb water supplied through line 10 into reaction vessel 13, which is an iron autoclave. 11 with the aid of pump 12, and introduced through line The reaction mixture is heated at the necessary temperature while being permanently stirred with stirring means 14, and the pressure necessary in reaction vessel 13 is adjusted by introducing an inert gas through line 15. In order to avoid overpressure, line 16 is equipped with a safety valve 17. Temperature and pressure can be read on the measuring instruments 26 and 26' respectively. The intert gas is exchanged through lines 15 and 9, respectively, the gas flowing off leaving reaction vessel 13 through off-gas line 9 connected in series relationship to a cooler 35 and a gasometer 36. After an appropriate time of residence in reaction vessel 13, the reaction mixture is removed therefrom portionwise through line 18 in such a manner that the amount withdrawn per hour corresponds to the amount of feed product supplied per hour to the reaction vessel.

The reaction mixture collected in collecting means 19 is first cooled in cooler 21 and then travels through line 20 into separating vessel 22, wherein two layers are being formed. The upper organic layer, which contains unreacted acrylonitrile and 1,2-dicyanocyclbutane, is admixed e.g. with phosphoric acid supplied through line 24 and then conveyed through line 23 to evaporator 25, in which the unreacted acrylonitrile is expelled from the reaction product. The acrylonitrile flowing off is recycled through cycle line 2 to absorption vessel 5. The residue obtained on evaporation in evaporator 25 which consists substantially of 1,2-dicyanocyclobutane, is conveyed through lines 27 and 28 to evaporator 29, in which it is separated into 1,2-dicyanocyclobutane as the head product and into an undefined residue. 1,2-dicyanocyclobutane is withdrawn from evaporator 29 through line 30, and the evaporation residue is removed through line 31.

The lower aqueous layer accumulating in separating vessel 22, which contains some dissolved 1,2-dicyanocyclobutane, is introduced through line 32 into evaporator 33, and the water is evaporated therein. The resulting steam leaves evaporator 33 through line 34, whereas recovered 1,2-dicyanocyclobutane is recycled through line 28 and combined with the bulk of the process product in evaporator 29.

Figure 2:
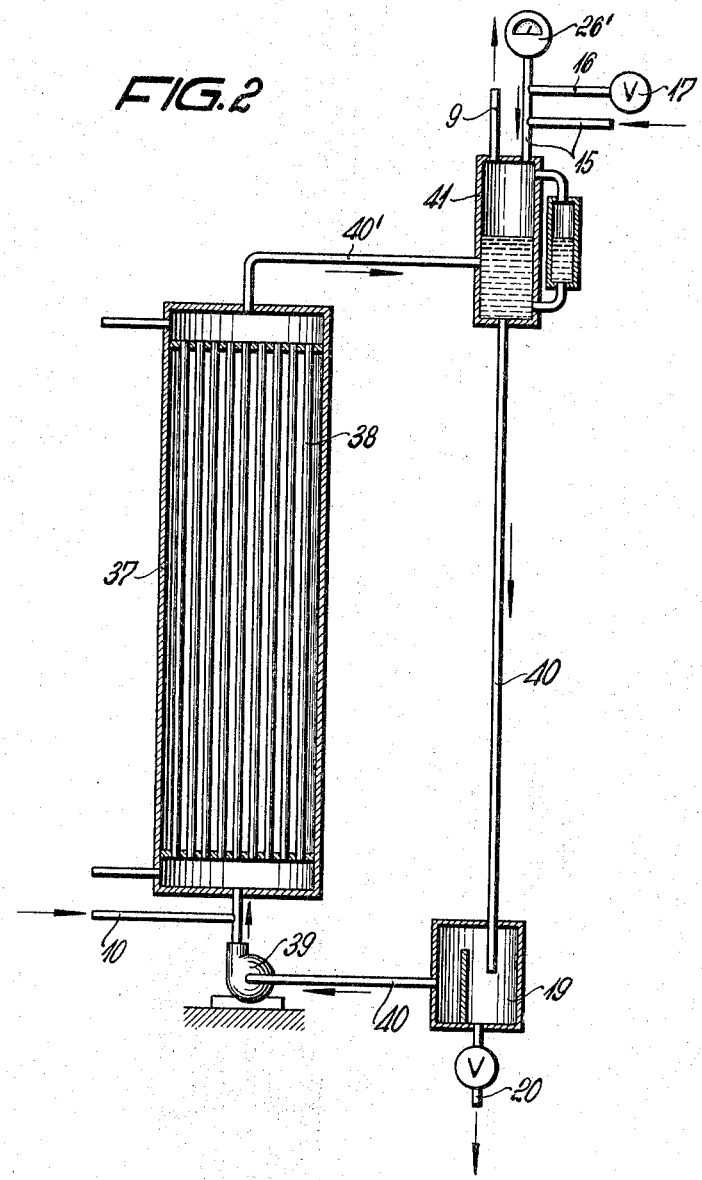

For larger batches, the stirring autoclave 13 represented in FIG. 1 is replaced with the means shown in FIG. 2, which substantially consists of an iron autoclave 37 suitable as a heat exchanger and having inserted internal vertical heating pipes 38. The stabilized acrylonitrile is introduced in a manner analogous to FIG. 1 through supply line 10 into iron autoclave 37 designed as a heat exchanger, and cycled through lines 40 and 40' with the aid of circulating pump 39. Cycle lines 40 and 40' are connected in series relationship to a sojourn vessel 41 serving to control the liquid level and to a collecting vessel 19. Inert gas is forced under pressure through line 15 into sojourn vessel 41 having a safety valve 17 and a pressure meter 26' to avoid overpressure therein. The escaping inert gas leaves sojourn vessel 41 through off-gas pipe 9. The reaction mixture is withdrawn from collecting vessel 19 through discharge line 20, and the 1,2-dicyanocyclobutane is worked up or separated from the reaction mixture in the manner set forth in FIG. 1.

The advance achieved with the process of the present invention resides in that acrylonitrile can be dimerized in the liquid phase to 1,2-dicyanocyclobutane in permanent operation for a period of time exceeding 600 hours up to three months without any reduction of conversion rate and yield while omitting costly pressure vessels of the type proposed in the process forming the subject of British Patent No. 897,275. The acrylonitrile recovered in the working up of the reaction mixture is free from germs promoting polymerization and can be recycled into the reaction vessel.

*Example 1*

2 kg. acrylonitrile distilled over phosphoric acid, stabilized with 250 parts per million phenothiazine and containing 2 liters absorbed nitrogen monoxide gas were pumped into a 5-liter steel autoclave and admixed therein with 280 grams water. The reaction mixture so produced was heated at 240° C. and a pressure of 50 atmospheres was adjusted in the reaction vessel by introducing nitrogen as an inert gas. The inert gas supplied was renewed hourly by introducing 50 liters fresh nitrogen.

In order to dimerize the acrylonitrile in continuous manner, the reaction vessel, once the reaction temperature had been reached, was continuously supplied, per hour, with 1 kg. fresh acrylonitrile pretreated with phenothiazine and nitrogen monoxide, and with 140 grams water, while a corresponding proportion of partially dimerized reaction product was withdrawn concurrently therewith, so that the feed product was allowed to stay in the reaction vessel for a period of 2 hours. The reaction product obtained in the course of 1 hour, which had a pH-value of 5.5, was admixed with some drops of phosphoric acid so as to adjust the pH to a value of 4, and then distilled at atmospheric pressure. The resulting recovered acrylonitrile was replenished with fresh acrylonitrile, stabilized with phenothiazine and nitrogen monoxide, and recycled to the reaction vessel.

On distilling the reaction product withdrawn, a residue containing all the 1,2-dicyanocyclobutane was obtained in a yield of 156 grams, corresponding to an acrylonitrile conversion rate of 15.6% of the theoretical. The residue was distilled in the vapor phase under a pressure of 2 mm. mercury at a temperature of 115–160° C. and 148 grams of a cis-trans-isomer mixture of 1,2-dicyanocyclobutane were obtained, corresponding to a yield of 94.9%, calculated on the acrylonitrile which underwent conversion. The two isomers could be separated from one another without difficulty by fractional distillation under reduced pressure, the trans-1,2-dicyanocyclobutane having a boiling point of 115° C. at 2 mm. mercury, and the cis-compound having a boiling point of 145° C. at 2 mm. mercury. The conversion rate and yield remained unchanged even during operation for more than 600 hours.

*Example 2*

2 kg. acrylonitrile distilled over phosphoric acid, stabilized with 250 parts per million phenothiazine and containing 2 liters absorbed nitrogen monoxide gas were pumped into a 5-liter steel autoclave and admixed therein with 280 grams water. The reaction mixture so produced was heated at 240° C. and a pressure of 50 atmospheres was adjusted in the reaction vessel by introducing nitrogen as an inert gas. The inert gas supplied was renewed hourly by introducing 50 liters fresh nitrogen.

In order to dimerize the acrylonitrile in continuous manner, the reaction vessel, once the reaction temperature had been reached, was continuously supplied, per hour, with 0.5 kg. fresh acryonitrile pretreated with phenothiazine and nitrogen monoxide, and with 70 grams water, while a corresponding proportion of partially dimerized reaction product was withdrawn concurrently therewith, so that the feed product was allowed to stay in the reaction vessel for a period of 4 hours. The reaction product obtained in the course of 1 hour, which had a pH-value of 5.5, was admixed with some drops phosphoric acid so as to adjust the pH to a value of 4, and then distilled at atmospheric pressure. The resulting recovered acrylonitrile was replenished with fresh acrylonitrile, stabilized with phenothiazine and nitrogen monoxide, and recycled to the reaction vessel.

On distilling the reaction product withdrawn, a residue containing all the 1,2-dicyanocyclobutane was obtained in a yield of 112 grams, corresponding to an acrylonitrile conversion rate of 22.4% of the theoretical. The residue was distilled under a pressure of 2 mm. mercury at a temperature of 115–160° C. and 105 grams of a cis-trans-isomer mixture of 1,2-dicyanocyclobutane were obtained, corresponding to a yield of 93.8%, calculated on the acrylonitrile which underwent conversion. The two isomers could be separated from one another without difficulty by fractional distillation under reduced pressure. The conversion rate and yield remained unchanged even during operation for a period of time of about 226 hours.

*Example 3*

15 kg. acrylonitrile distilled over phosphoric acid, stabilized with 250 cc. phenothiazine and 1000 cc. NO-gas per kg. acrylonitrile, ware introduced per hour into the 75-liter iron autoclave 37 designed as a heat exchanger and admixed with 14% water, calculated on the amount of acrylonitrile. The reaction temperature was maintained at 235° C. and the pressure at 50 atmospheres. The material in the autoclave was circulated at the rate of 1–2 m.³/hr. by means of circulating pump 39. Sojourn vessel 41 having a sight glass was used to control the liquid level. The inert gas temperature was exchanged by supplying 1.0 m.³/hr. nitrogen. The resulting product was withdrawn through collecting vessel 19 and line 20 in the same manner as feed mixture was introduced, so that the time of residence amounted to 4 hours. The reaction product obtained hourly with a pH-value of 5.8 was adjusted to a pH-value of 4 by adding phosphoric acid, unreacted acrylonitrile was distilled off and recycled to the iron autoclave 37.

Crude product freed from acrylonitrile was obtained in a yield of 3.4 kg., corresponding to a conversion rate of 22.7%, calculated on the acrylonitrile feed. The crude product was distilled under a pressure of 6 mm. mercury to yield 3.2 kg. of a cis-trans-isomer mixture of 1,2-dicyanocyclobutane, corresponding to a yield of 94.2%, calculated on the acrylonitrile feed.

What is claimed is:

1. In the process for the continuous manufacture of 1,2-dicyanocyclobutane by catalytic dimerization of acrylonitrile at elevated temperatures and under the atmosphere of an inert gas followed by distillative removal of unreacted feed product, the improvement which comprises dimerizing the acrylonitrile in the liquid phase in the presence of about 100 to 2000 cc. nitrogen monoxide per kilogram acrylonitrile and water in a proportion of about 1 to 20% by weight, calculated on the acrylonitrile, as the catalyst at a pH-value of 4–7, a temperature of about 180 to 260° C. and under an inert gas pressure of 10 to 100 atmospheres, the dimerization being carried out within a period of time of 1 to 6 hours in a reaction vessel, withdrawing unreacted feed product from the reaction vessel, separating said unreacted feed product by distillation from the resulting reaction product, and recycling said unreacted feed product in admixture with fresh feed product to the reaction vessel.

2. The process of claim 1, wherein the reaction mixture prior to the distillative removal of unreacted acrylonitrile is admixed with an acid selected from the group consisting of sulfuric acid, acetic acid and phosphoric acid to adjust the acidity of the reaction mixture to a pH-value of about 4.

3. The process of claim 1, wherein the inert gas is a member selected from the group consisting of nitrogen and hydrogen.

4. The process of claim 1, wherein the acrylonitrile used as the feed product is stabilized with about 0.001 to 0.1% by weight phenothiazine.

5. The process of claim 1, wherein the acrylonitrile is dimerized continuously in a reaction vessel maintained under the atmosphere of an inert gas, and the inert gas atmosphere is constantly renewed by continuously supplying about 10 to 100 ilters inert gas per hour.

6. The process of claim 1, wherein the reaction mixture in the reaction vessel is continuously mixed by stirring it.

References Cited by the Examiner

UNITED STATES PATENTS 3,096,360   7/1963   Sennelwald _____ 260—464

FOREIGN PATENTS 897,275   5/1962   Great Britain.

CHARLES B. PARKER, *Primary Examiner.*

JOSEPH P. BRUST, *Examiner.*